US006906473B2

United States Patent
Alexandrov

(10) Patent No.: US 6,906,473 B2
(45) Date of Patent: Jun. 14, 2005

(54) FEEDBACK CIRCUIT AND METHOD OF OPERATING BALLAST RESONANT INVERTER

(75) Inventor: Felix I. Alexandrov, Burlington, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/649,898

(22) Filed: Aug. 26, 2003

(65) Prior Publication Data

US 2005/0046359 A1 Mar. 3, 2005

(51) Int. Cl.[7] .............................................. H05B 37/02
(52) U.S. Cl. .................. 315/224; 315/244; 315/209 R; 315/360; 315/DIG. 7
(58) Field of Search ................................ 315/224, 244, 315/209 R, 291, 360, 219, 248, DIG. 5, DIG. 4, DIG. 7

(56) References Cited

U.S. PATENT DOCUMENTS

| | | | | |
|---|---|---|---|---|
| 4,748,383 A | * | 5/1988 | Houkes ..................... 315/248 |
| 4,998,046 A | | 3/1991 | Lester ..................... 315/209 R |
| 5,245,253 A | | 9/1993 | Quazi ........................ 315/224 |
| 5,719,472 A | | 2/1998 | Kachmarik et al. ......... 315/224 |
| 5,723,953 A | | 3/1998 | Nerone et al. .............. 315/307 |
| 5,962,987 A | * | 10/1999 | Statnic ....................... 315/248 |
| 5,982,108 A | * | 11/1999 | Buij et al. .............. 315/209 R |
| 6,016,257 A | * | 1/2000 | Chang et al. ................ 363/17 |
| 6,246,183 B1 | | 6/2001 | Buonavita ................... 315/248 |

OTHER PUBLICATIONS

International Rectifier, Design Tip DT 98–1, Variable Frequency Drive Using IR215X Self–Oscillating IC's, pp. 331–337, Mar. 15, 1999.
International Rectifier, Application Notes AN–995A, Electronic Ballast Using The Cost–Saving IR215X Driver, pp. C59–C68, no date.

* cited by examiner

Primary Examiner—Haissa Philogene
(74) Attorney, Agent, or Firm—Carlo S. Bessone

(57) ABSTRACT

A ballast resonant inverter with a self-oscillating driver IC powers and dims a gas discharge lamp. A feedback circuit automatically adjusts IC oscillator frequency for safe and stable inverter operation above the resonant frequency following changes in the resonant load. The feedback signal is derived from resonant inverter output voltage, by attenuating, programmed phase shifting and injecting the resulting signal in a timing circuit of the IC. The feedback circuit includes an active inverter circuit or passive RC phase boosting networks coupled in series. Phase control of the feedback signal by variable RC networks is used in transient modes of ballast-lamp operations.

14 Claims, 7 Drawing Sheets

FEEDBACK CIRCUIT AND METHOD OF OPERATING BALLAST RESONANT INVERTER

BACKGROUND OF THE INVENTION

The present invention relates to electronic ballasts for powering gas discharge lamps and particularly to DC/AC inverters for energizing and dimming gas discharge lamps, including inductively coupled gas discharge lamps.

A gas discharge lamp typically utilizes an electronic ballast for converting AC line voltage to high frequency current for powering the lamp. Conventional electronic ballasts include an AC to DC converter and a resonant inverter converting DC voltage to lamp high frequency current. The resonant inverter includes switching transistors generating a high frequency rectangular AC voltage that is applied to a voltage resonant circuit having an inductor and a capacitor in series. The gas discharge lamp is coupled in parallel to the capacitor. For high frequency electronic ballasts, a self-oscillating resonant inverter is a common part that generates AC voltage for starting and AC current for powering the lamp. Self-oscillating resonant inverters utilize a feedback transformer coupled between a resonant circuit and gates of the switching transistors to provide a sinusoidal voltage to the gates for sustaining the oscillations. Dead time intervals for the switching transistors are automatically formed when crossing near zero gate voltage providing zero voltage switching (ZVS). Self-oscillating resonant inverters are described, for example, in U.S. Pat. Nos. 4,748,383, 5,962,987 and 5,982,108.

A typical voltage feedback self-oscillating circuit is shown in FIG. 1. The self-oscillating inverter is self-adjusted to above resonant frequency. If resonant frequency changes with temperature, lamp inductance and load variations, the inverter will still operate above the resonant frequency. However, driving MOSFET's with a sinusoidal voltage causes dead time variations followed by lamp power variations and other disadvantages.

As shown in FIG. 1, a prior art electronic ballast for powering a gas discharge lamp converts a standard AC line voltage to a high frequency current for lighting the lamp. An AC/DC converter is coupled to the AC line through an EMI filter. The AC/DC converter includes a rectifier (not shown) and, optionally, a power factor corrector. An AC/DC converter output low frequency ripple is filtered out by an electrolytic storage capacitor C31 connected across a high voltage DC bus. The self-generating ballast inverter is connected to the DC bus and its output is connected to the lamp. The storage capacitor C31 reduces the high frequency voltage ripple across the DC bus. Two series switching MOSFET's M1 and M2 are coupled across the DC bus. A resonant load includes series an inductor L1, a capacitor C3, and the lamp that is coupled in parallel to the capacitor C3. The resonant load is connected in parallel to the switching MOSFET M2 via a DC blocking capacitor C1. The switching transistors M1 and M2 are driven through resistors R16 and R15 via voltage feedback circuit that includes transformer T9 and an output voltage divider with capacitors C27 and C30. The ballast inverter in FIG. 1 includes a starting circuit built with a starting capacitor C29, a resistor R19 charging the starting capacitor C29 from the DC bus, a discharged iac X28 coupled to the starting capacitor C29 and blocking diode D10 for discharging the starting capacitor C29 after inverter starting.

With the feedback circuit in FIG. 1, the switching phase of the inverter transistors is locked with the phase of the output voltage oscillations load, thereby preventing the inverter from running below resonant frequency.

Ballasts with high frequency integrated circuit (IC) oscillating inverter controllers, such as the IR 215X series from International Rectifier or the L6579 series from ST Microelectronics, do not have the drawbacks of self-oscillating circuits. With shutdown and restarting features, these IC driven inverters can be used for ON/OFF pulse width modulation (PWM) dimming. However, with a pre-adjusted switching frequency that is not sensitive to transient variations and fluctuations of resonant frequency of the resonant load, direct application the above controllers has been troublesome. Without correction of switching frequency, MOSFET's could have cross conduction and fail when operating below resonant frequency in some steady-state conditions, dimming mode or at lamp starting.

A solution to this problem is described in Application Notes AN 995A "Electronic Ballasts Using the Cost-Saving IR215X Drivers" issued by International Rectifier. FIG. 2 illustrates a feedback circuit with two anti-parallel power diodes connected in series with the resonant load as zero current detectors. The diodes generate a rectangular AC pulse signal that forces the timing circuit for the IC to switch synchronously with this signal. A feedback signal indicates phasing of current in the resonant load. However, zero current sensing in any portion of the resonant load does not provide the necessary synchronization angle for optimized operation mode above the resonant frequency. In addition, when used as a source of synchronization signals, the power diodes add significant power losses to the ballast.

The prior art electronic ballast shown in FIG. 2 includes a self-oscillating controller for driving switching transistors M1 and M2 of the resonant inverter. A resonant load includes an inductor L, capacitor C2 and a fluorescent lamp coupled in parallel with capacitor C2. The resonant load is connected via DC blocking capacitor C1 in parallel to transistor M2. An IR2155 controller includes a timer (known as a "555" timer), with timing capacitor $C_T$ and timing resistor $R_T$ being external components that determine the oscillating frequency. Anti-parallel diodes D46 and D51 connected in series circuit with the resonant inductor L are used as zero current detectors generating a rectangular pulse signal. This signal is injected between the timing capacitor CT and ground.

Other prior art IC driven ballasts are disclosed in U.S. Pat. Nos. 5,723,953 and 5,719,472. Both patents teach IC feedback control with a resistor, placed in a manner similar to the anti-parallel diodes D46 and D51 in FIG. 2. The resistor signal indicates both the level of current in the resonant load and the phasing of this current. According to these two patents, the feedback signal is injected into the IC timing circuit during lamp starting. As a result, inverter frequency is reduced to a level of the resonant frequency and, accordingly, inverter output voltage increases for lamp starting. The higher the resistor signal, the lower the inverter switching frequency, the higher the output inverter voltage, and accordingly, the resistor signal. It was found that the prior art inverter feedback circuit may cause excessive starting voltage and operation below the resonant frequency. If it is used in a steady state mode, this positive feedback circuit creates instability.

The present inventor has found, when synchronizing prior art inverters with an open feedback loop from an independent sinusoidal control signal source and optimizing inverter switching frequency above the resonant frequency, that the signal injected into the IC timing circuit is significantly out of phase from the signals generated across the above-described current sensors. The phase difference between the inverter output voltage and the external synchronization signal is typically in a range from 150° to 200° depending on resonant load, type of IC and selected operating frequency.

It is desirable, for reliable phase lock and before closing the loop, that the injected feedback signal be generated with a minimum phase difference between the inverter output voltage and the external synchronization signal to provide an optimum mode for the loop inverter. In this case, the injected signal will dominate the ramp signal and the inverter will operate at this optimum mode after closing the loop. It is also desirable that power components, such as diodes and resistors, not be used as sensors in the resonant load to avoid additional power losses.

In any obvious possible connection of current sensing diodes (in series with resonant capacitor, inductor, or lamp), it is difficult, or even impossible to achieve an optimum mode phase lock in a resonant inverter driven by self-oscillating AC.

Therefore, there is still a need for improvements in inverter controls, in particular with more advanced controller integrated circuits.

OBJECTS AND SUMMARY OF THE INVENTION

It is an object of the present invention to provide a novel method for optimized and stable operation of a ballast driven by a self-oscillating driver.

It is another object oft he present invention to provide a novel feedback phase lock circuit with adjustable phase shifting.

It is a further object of the invention to provide a novel ballast with a feedback circuit with passive components.

It is still another object of the invention to provide ballast/lamp current/voltage control through a novel controllable feedback circuit.

It is yet another object of the invention to provide a novel feedback circuit generating an advanced phase internal synchronization signal that limits ballast output voltage during lamp starting.

It is a still further object of the invention to provide reliable inverter operation in a periodical ON/OFF mode with pulse width modulation (PWM) dimming.

The present invention provides an efficient method for controlling a resonant inverter driven by a self-oscillating integrated circuit with a small sinusoidal signal derived from an output inverter voltage. This method includes attenuating an output voltage, phase shifting the attenuated signal, and injecting the attenuated signal into the timing circuit for the driver.

One of embodiments of the present invention provides a feedback circuit with a signal inverter for phase shifting of an attenuated output voltage.

A second embodiment of the present invention includes a feedback circuit with combinations of RC phase-shifting networks.

A third embodiment of the present invention includes a feedback circuit with controllable phase of the output signal for limiting ballast output voltage.

A fourth embodiment of the present invention, preferably for inductively coupled lamps, includes a synchronization circuit with a controllable number of RC phase-shifting networks in which an additional RC network is switched ON during lamp starting to limit lamp starting voltage.

Advantageously, the present invention enables IC oscillations to be locked with a frequency that is above the free oscillation frequency of the ballast resonant load including the lamp. When lamp impedance and resonant frequency vary, the switching frequency will vary accordingly, so the ballast inverter will continue to operate in a safe area above resonant frequency. The invention provides PWM dimming with permanently changed impedance of the dimmed lamp and variable resonant frequency.

DESCRIPTION OF PREFERRED EMBODIMENTS

Figure 3:
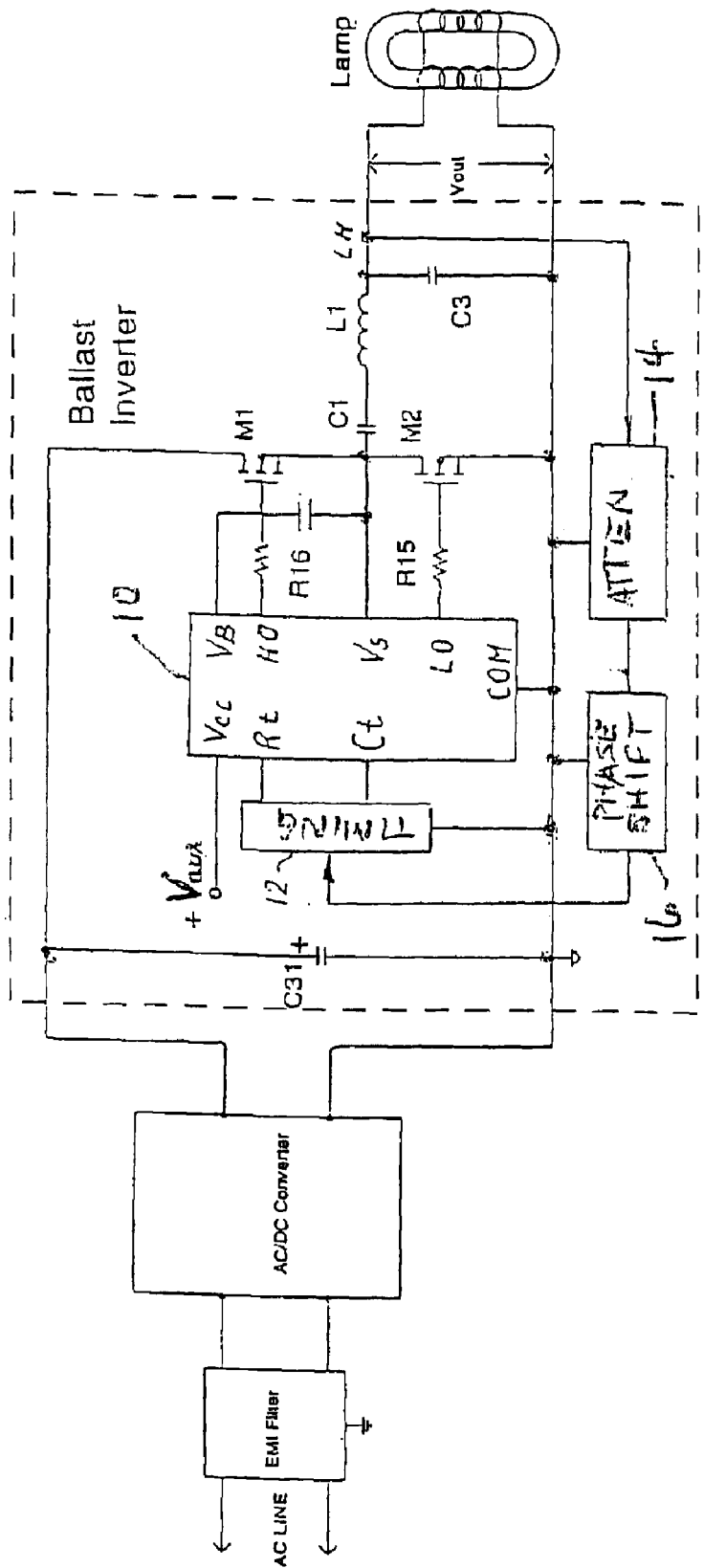
FIG. 3 is a circuit diagram of a ballast of the present invention with a self-oscillating driver IC synchronized by a voltage feedback circuit.

With reference now to FIG. 3, a self-oscillating driver IC 10 drives half bridge power stages with transistors M1 and M2 generating an AC voltage across the input of a resonant load. IC 10 has a built-in oscillator that is, or is similar to, the "555" timer of the prior art. Oscillator frequency can be programmed with a timing circuit 12 coupled to pins Rt, Ct and common "com".

The feedback circuit includes blocks 14 and 16 that couple inverter high voltage output LH to timing circuit 12. Block 14 attenuates the output voltage signal and block 16 phase shifts the output voltage signal from 150° to 200° to compensate for the phase difference between the inverter output voltage and the external synchronization signal.

Figure 1:
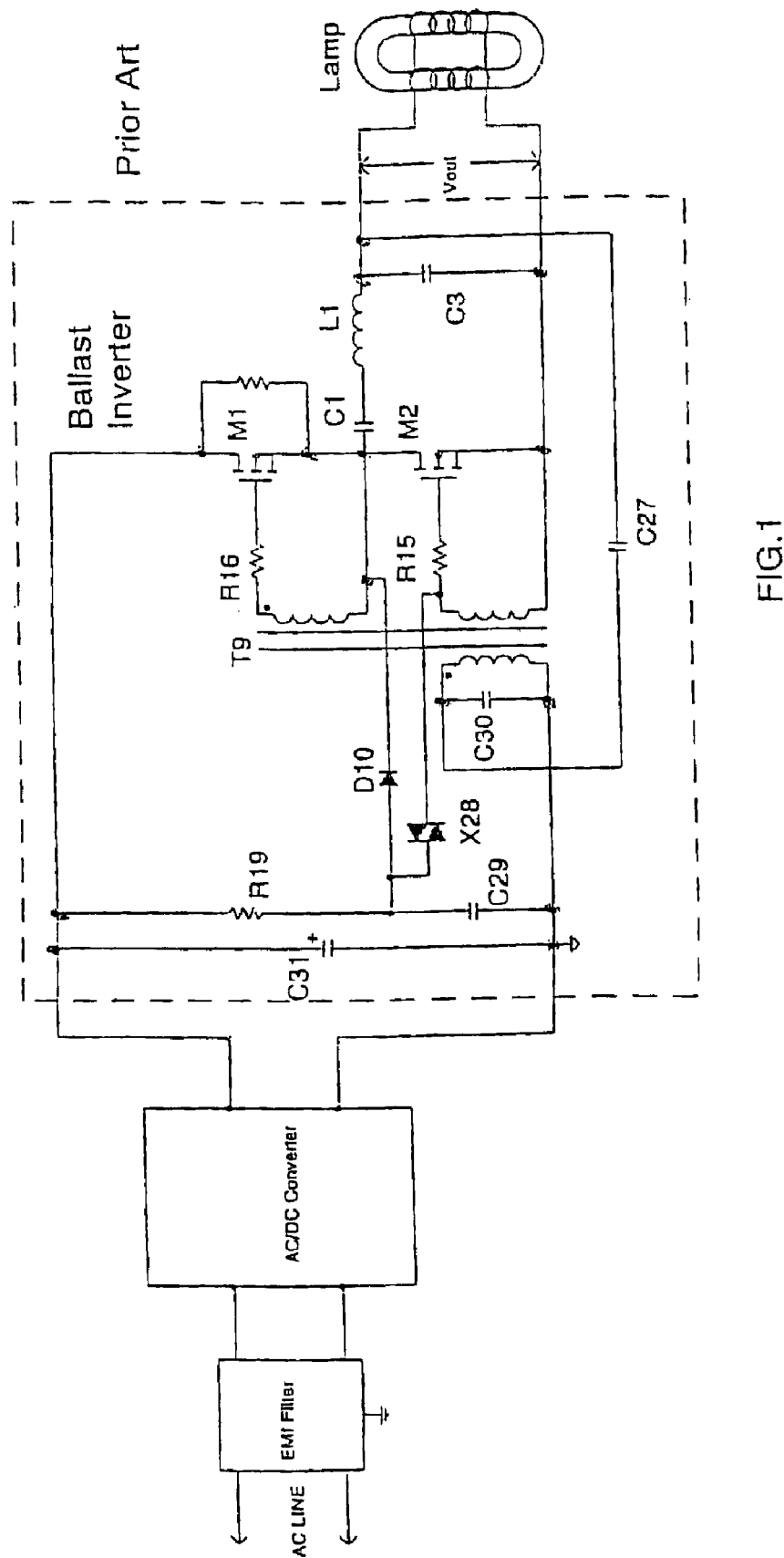
FIG. 1 is a circuit diagram of a conventional ballast with self-oscillating inverter.
Figure 2:
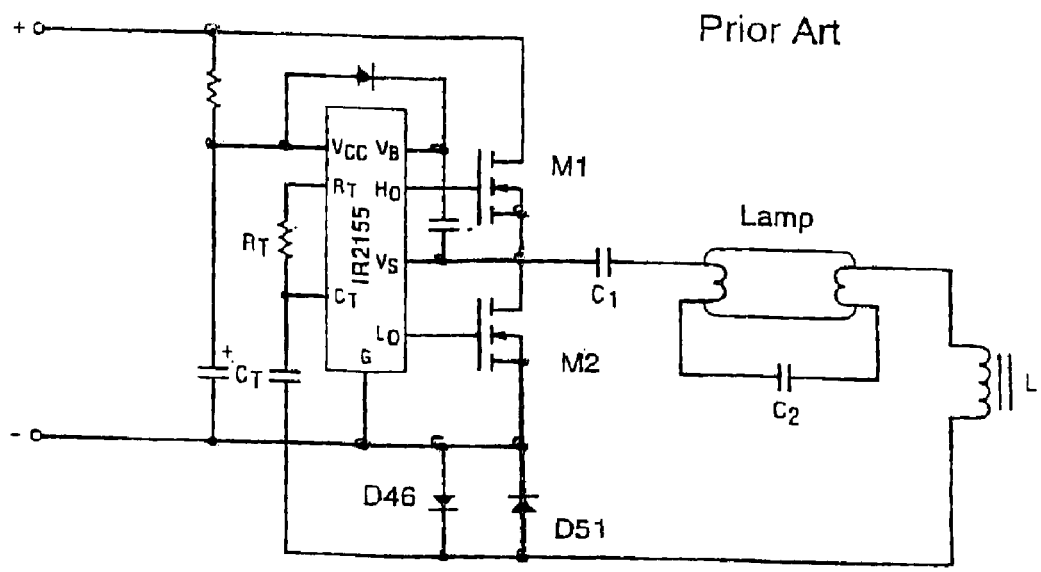
FIG. 2 is a circuit diagram of a conventional ballast with a self-oscillating driver IC.

Timing circuit 12 may include a timing capacitor Ct and resistor Rt (see FIG. 2) and switches when the timing capacitor is charged to ⅔ Vcc and discharged to ⅓ Vcc. In a standard IC application, the timing capacitor voltage waveform is an exponential ramp that is superposed on the DC voltage. By mixing in a small phase shifted signal to the ramp, the IC oscillator correlates its frequency. Preferably, a source of this signal is coupled between ground and the timing capacitor.

Figure 4:
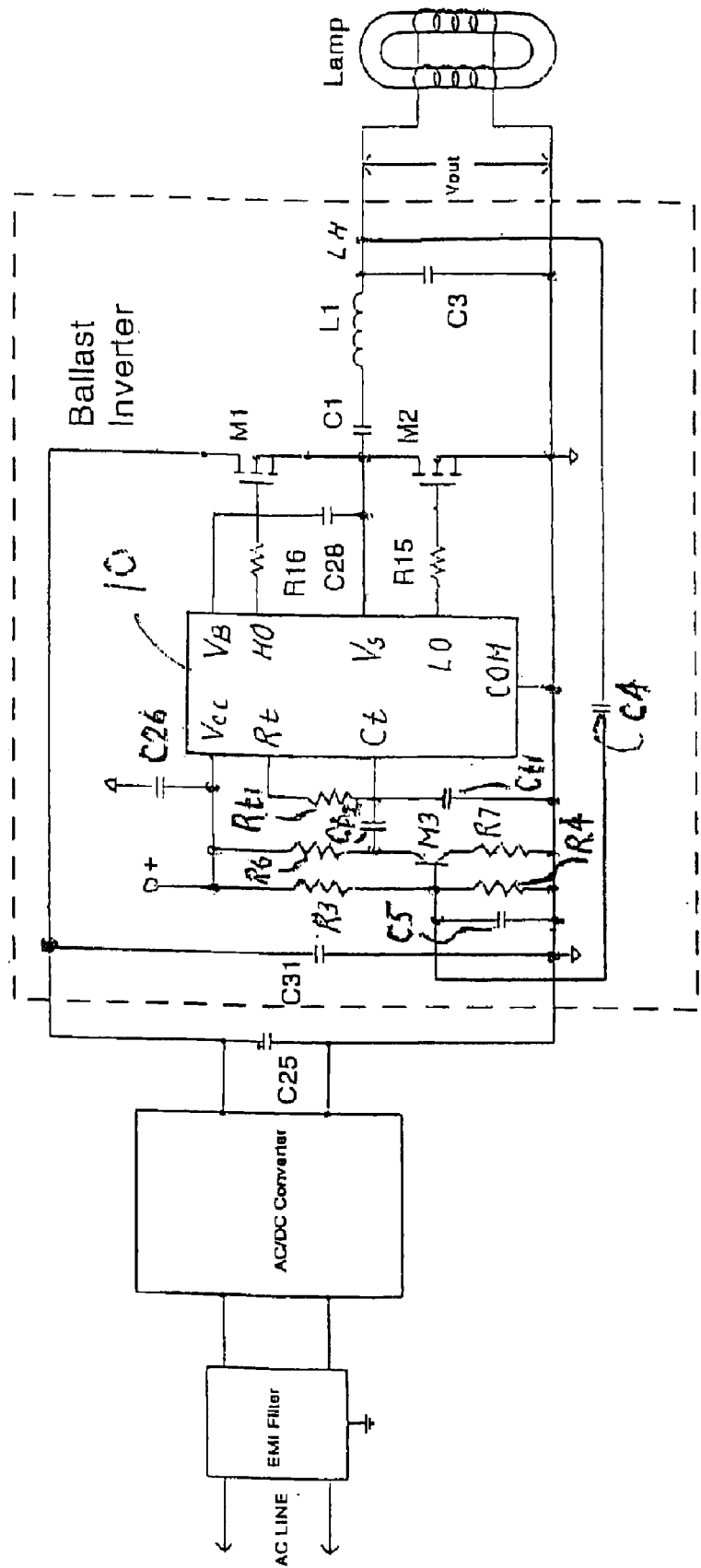
FIG. 4 is a circuit diagram of the ballast of the present invention utilizing active phase shifting in the feedback circuit.

In an embodiment of the device shown in FIG. 4, which is particularly suited for high frequency application (200–270 kHz), attenuating block 14 (FIG. 3) includes a capacitive divider with capacitors C4 and C5 connected to inverter high voltage output LH. Phase shifting block 16 includes an active signal inverter that includes transistor M3 and resistors R3, R4, R6 and R7. The output of the capacitive divider is connected to the input of the active signal inverter. The output of the active signal inverter is connected to the Ct pin of IC 10 via a second timing capacitor Ct2 and timing circuit 12. The active signal inverter provides a stable phase shift of about 180° at any frequency. Thus, the active signal inverter compensates for about 180° of phase difference between the input and output of the open loop inverter operating above resonant frequency.

In one embodiment for electrodeless lamp ballasts, the circuit of FIG. 4 may include the following components: IC 10-IR21531D, M3-BC337, C4 and Ct2-22 pF, Ct1-250 pF, C5-4.7 nF, Rt1-10K, R3-100 k, R7-750, R4-15 k, R6-15 k, R15 and R16-22 k, C26 and C28-0.1 uF. The ballast inverter switches at 250 kHz. With an open loop circuit, the ballast inverter switches at 242 kHz. Resonant frequency of the inverter resonant load is about 220 kHz. The sinusoidal signal injected to pin Ct of IC 10 via timing capacitor Ct2 dominates above the ramp signal generated by the timer even though it has a much smaller level than the ramp signal. The switching frequency of the inverter depends on the resonant load as in self-generated resonant ballasts without an IC.

Figure 5:
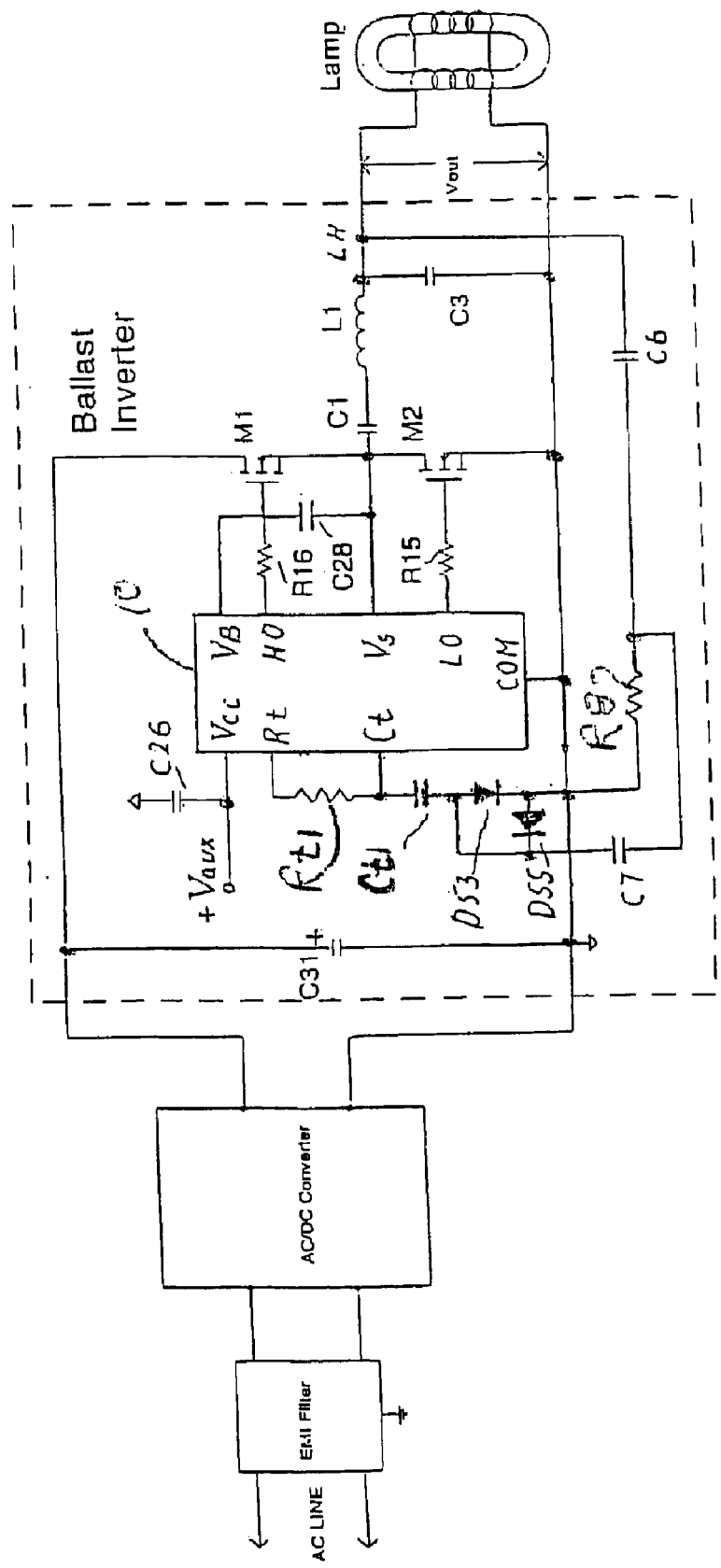
FIG. 5 is a circuit diagram of the ballast of the present invention with a feedback circuit utilizing signal attenuation and phase shifting by plural RC phase-shifting networks.

In other embodiments of the present invention, resistive means may be connected between timing capacitor Ct1 and common "com" of IC 10. FIG. 5 shows two anti-parallel diodes D53 and D55 that may serve as the resistive means, although resistor(s) can be used instead of diodes (for example, see R10 in FIG. 6).

With further reference to FIG. 5, the feedback circuit may include two RC phase-shifting networks that perform the functions of blocks 14 and 16. The first network includes a capacitor C6 coupled to high voltage output LH and a resistor R8 coupled to common. The second network includes a capacitor C7 and the resistive means. The second network is connecter in parallel to resistor R8 of the first network. Capacitor C6 may be a high voltage capacitor connected to LH while other components may be low voltage, low power components. As previously explained, a phase shift angle of about 150–200 degrees is needed for optimizing the feedback phase lock. The two series RC networks provide attenuation of the feedback signal more than 100 times and a programmable phase shifting up to around 180°. The ballast inverter starts with a programmed initial switching frequency determined by timing capacitor Ct1 and resistor Rt1. As soon as a voltage appears at LH, the inverter will be internally synchronized as the feedback signal will dominate the "555" timer ramp signal of IC 10. Inverter frequency will be automatically corrected so that input/output phase difference at selected switching frequency will be automatically compensated by the RC phase boosting networks in the feedback circuit.

Figure 6:
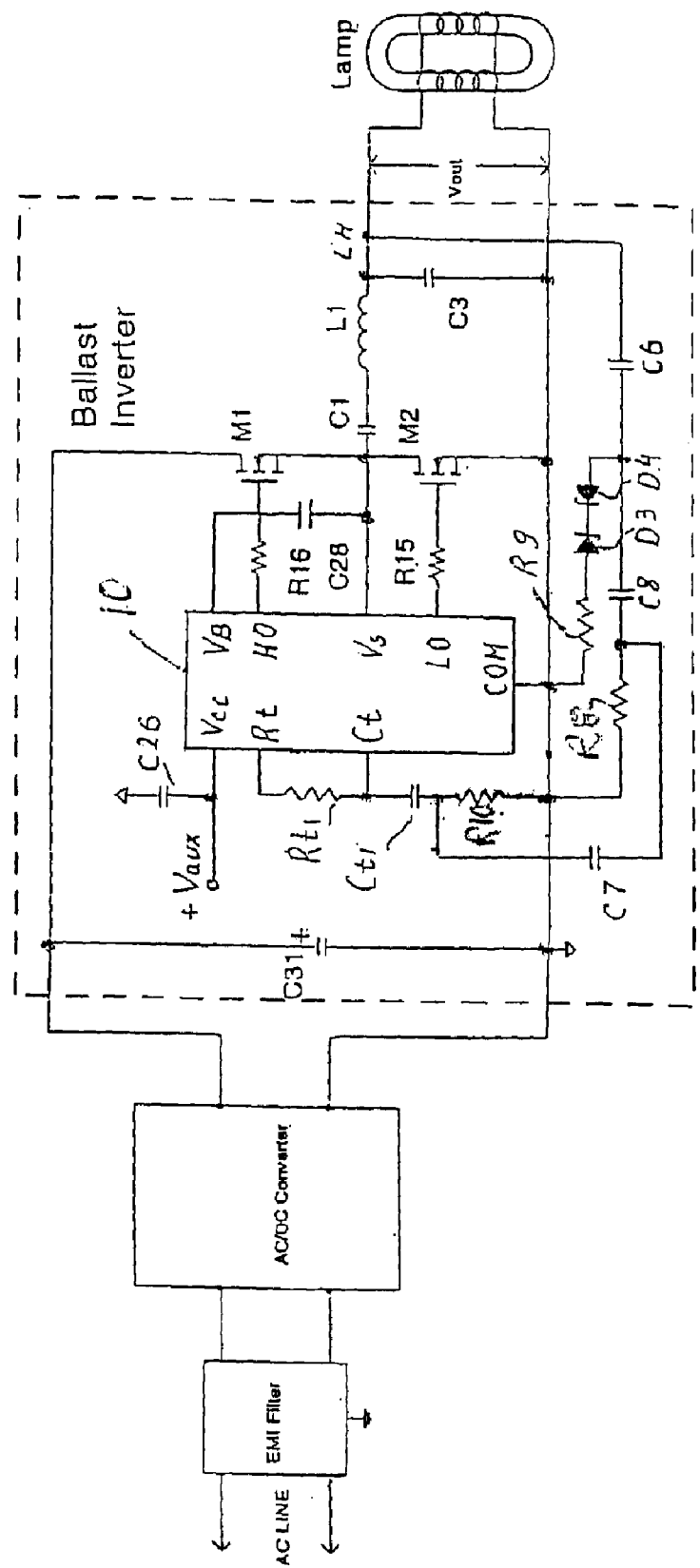
FIG. 6 is a circuit diagram of the invention with a phase controlled feedback circuit.

FIG. 6 shows a modification of the embodiment of FIG. 5 with a third RC phase-shifting network that is added during lamp starting. The third RC network includes capacitor C8, resistor R9 and as witching means connected in series with resistor R9. The switching means may include two series Zener diodes D3 and D4 connected in opposite directions. During lamp starting, voltage that is applied across the circuit comprising resistor R9 and Zener diodes D3 and D4 is much higher than the Zener diodes' threshold voltage. During steady-state operation, the peak of this voltage is lower than the Zener diodes' threshold. The Zener diodes provide a switching function by adding a third RC phase-shifting network during lamp starting to limit starting voltage. Ballast components should be protected from overstressing in starting and no-load operation modes. In feedback circuit of FIG. 6, two anti-parallel diodes (such as in FIG. 5) can be used instead resistor RIO for better stability.

Figure 7:
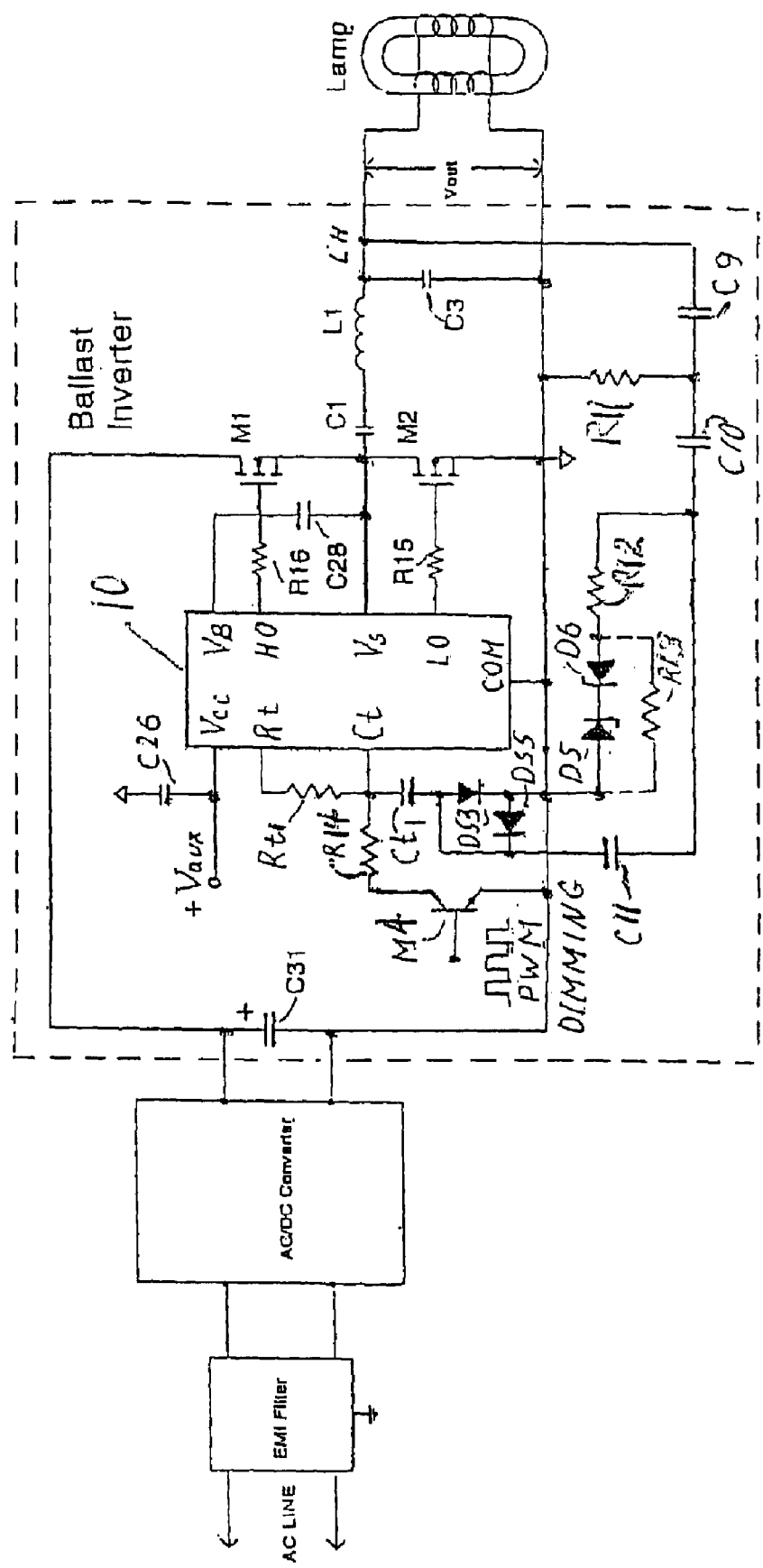
FIG. 7 is a circuit diagram of the invention in a lamp dimming application.

A self-oscillating dimmed ballast circuit is shown in FIG. 7. The ballast inverter includes a feedback circuit with a variable structure having three RC phase-shifting networks. The first RC-network includes high voltage capacitor C9 and resistor R11. The second RC network includes capacitor C10, resistor R12 and Zener diodes D5 and D6. The third RC network includes capacitor C11 and anti-parallel diodes D53 and D55 connected between timing capacitor Ct1 and IC 10 common terminal "com". Resistor R13 connected across anti-parallel Zener diodes D5 and D6 is provided when more than 180° phase-shifting is needed in the feedback circuit for optimized steady-state operation of the inverter (for example 200° phase shifting). PWM signal controlled switching means (for example, transistor M4 in FIG. 7) is connected to the Ct pin of IC 10 via resistor R14. By turning ON transistor M4, IC 10 shuts OFF the ballast inverter. When transistor M4 is OFF, the ballast inverter turns ON. A duty ratio of transistor M4 switching is controlled by a PWM dimmer (not shown in FIG. 7). In an ON/OFF dimming mode, resonant frequency of the resonant load is not stable, as it depends on PWM frequency, duty ratio, temperature, etc. However, the internal synchronization circuit shown herein tracks all current variations of the resonant frequency providing operation of the resonant inverter in the safe area above resonant frequency.

In a particular embodiment for a 150W electrodeless lamp with PWM dimming, the feedback circuit in FIG. 7 was utilized in a 250 kHz ballast with the following components: IC 10-IR21531D, Rt1-10 k, Ct1-270 pF, D53 and D55-1N4148, M4-BC337, C9-22 pF, R11-1.3 k, C10-1 nF, R12-1.8 k, D5 and D6-16V, 0.5W Zener, and C11-47 pF. The circuit could provide dimming in the range of 10–100% with up to a 10 kHz PWM signal with high efficiency.

While embodiments of the present invention have been described in the foregoing specification and drawings, it is to be understood that the present invention is defined by the following claims when read in light of the specification and drawings.

What is claimed is:

1. A ballast for a discharge lamp, comprising:
    a driver circuit;
    a timing circuit connected to said driver circuit;
    a resonant inverter connected to said driver circuit and having an output; and
    a voltage feedback circuit that provides a sinusoidal feedback signal into said timing circuit for synchronization of said timing circuit, said feedback circuit connects the output of said resonant inverter to said timing circuit, said voltage feedback circuit including a phase shifting circuit that attenuates and selectively shifts a phase of an output voltage from said resonant inverter.

2. The ballast of claim 1, wherein said phase shifting circuit comprises a signal inverter connected to an input to said timing circuit.

3. The ballast of claim 2, wherein said feedback circuit further comprises an attenuation circuit that includes a capacitive divider connected between the output and an input to said signal inverter.

4. The ballast of claim 1, wherein said phase shifting circuit comprises plural RC phase-shifting networks.

5. The ballast of claim 4, wherein a first of said phase-shifting networks comprises a first capacitor coupled to the output voltage and a first resistor coupled to said driver, and a second of said phase-shifting networks comprises a second capacitor and resistive means coupled to said timing circuit, said second network being connected in parallel with said first resistor.

6. The ballast of claim 5, wherein said resistive means comprises one of a resistor and anti-parallel diodes and is connected between said first resistor and said timing circuit.

7. The ballast of claim 5, further comprising a third RC network that includes a switch that connects said third RC network to said timing circuit during starting of a lamp that includes the ballast.

8. The ballast of claim 1, further comprising a switch operated by a pulse width modulation input and connected to said timing circuit.

9. A method of operating a ballast for a discharge lamp that includes a driver circuit, a timing circuit connected to the driver circuit, and a resonant inverter connected to the driver circuit and having an output, the method comprising the steps of:

feeding back an output voltage including a sinusoidal feedback signal from the resonant inverter into the timing circuit for synchronization of said timing circuit; and attenuating and selectively shifting a phase of the output voltage being fed back from the resonant inverter.

10. The method of claim 9, further comprising the step of attenuating the fed back output voltage with a capacitive divider connected between the output and the timing circuit.

11. The method of claim 9, wherein the phase shifting step includes the step of phase shifting with plural RC phase-shifting networks.

12. The method of claim 11, wherein a first of the phase-shifting networks includes a first capacitor coupled to the output and a first resistor coupled to the driver, and a second of the phase-shifting networks includes a second capacitor and resistive means coupled to the timing circuit, where the second network is connected in parallel with the first resistor.

13. The method of claim 12, wherein the RC networks further include a third RC network that includes a switch and the method further comprises the step of connecting the third RC network to the timing circuit only during starting of a lamp that includes the ballast.

14. The method of claim 9, further comprising the step of controlling the timing circuit with a switch operated by a pulse width modulation input during a dimming operation of a lamp that includes the ballast.

* * * * *